United States Patent
Moyer et al.

(10) Patent No.: US 7,237,149 B2
(45) Date of Patent: Jun. 26, 2007

(54) METHOD AND APPARATUS FOR QUALIFYING DEBUG OPERATION USING SOURCE INFORMATION

(75) Inventors: William C. Moyer, Dripping Springs, TX (US); John J. Vaglica, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 274 days.

(21) Appl. No.: 11/065,898

(22) Filed: Feb. 25, 2005

(65) Prior Publication Data

US 2006/0195721 A1 Aug. 31, 2006

(51) Int. Cl.
G06F 11/00 (2006.01)
(52) U.S. Cl. .............................. 714/30; 714/47; 714/31
(58) Field of Classification Search .................. 714/27, 714/31; 717/129
See application file for complete search history.

(56) References Cited

U.S. PATENT DOCUMENTS

| | | | |
|---|---|---|---|
| 4,811,208 A | | 3/1989 | Myers et al. |
| 4,860,195 A | | 8/1989 | Krauskopf |
| 5,043,990 A | * | 8/1991 | Doi et al. .................... 714/820 |
| 5,053,944 A | | 10/1991 | Krauskopf |
| 5,165,027 A | | 11/1992 | Krauskopf |
| 5,630,052 A | | 5/1997 | Shah |
| 5,659,679 A | | 8/1997 | Alpert et al. |
| 5,694,589 A | | 12/1997 | Glew et al. |
| 5,740,413 A | | 4/1998 | Alpert et al. |
| 5,944,841 A | * | 8/1999 | Christie ......................... 714/38 |
| 6,035,422 A | * | 3/2000 | Hohl et al. .................... 714/35 |
| 6,052,774 A | | 4/2000 | Segars et al. |
| 6,052,801 A | | 4/2000 | Hammond et al. |
| 6,738,929 B2 | * | 5/2004 | Swoboda et al. .............. 714/28 |
| 6,918,058 B2 | * | 7/2005 | Miura et al. ................... 714/30 |
| 2005/0060516 A1 | * | 3/2005 | Bottemiller et al. .......... 712/34 |
| 2006/0069952 A1 | * | 3/2006 | Peled et al. .................... 714/25 |

OTHER PUBLICATIONS

Wahl, N.J. Schach, S.R. Winner, R.I. A Dynamic Very High Level Debugger for Low Level Microprograms, Dec. 1986. ACM SIGMICRO Newsletter, vol. 17 Iss. 4.*

* cited by examiner

*Primary Examiner*—Scott Baderman
*Assistant Examiner*—Paul F. Contino
(74) *Attorney, Agent, or Firm*—Robert King; Susan Hill; Ranjeev Singh (57) ABSTRACT

A data processing system (10) has a system debug module (19) coupled to a processor (12) for performing system debug functions. Located within the system, and preferably within the processor, is debug circuitry (32) that selectively provides debug information related to the processor. The circuitry identifies which of a plurality of registers (26) is sourcing the debug information. A user-determinable enable and disable mechanism that is correlated to some or all of the registers sourcing the debug information specifies whether to enable or disable the providing of the debug information. In one form a single bit functions as the mechanism for each correlated register. Debug operations including breakpoints, tracing, watchpoints, halting, event counting and others are qualified to enhance system debug. The registers may be included in a programmer's model and can be compliant with one or more industry debug related standards.

19 Claims, 4 Drawing Sheets

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| GPR31 | GPR30 | GPR29 | GPR28 | GPR27 | GPR26 | GPR25 | GPR24 | GPR23 | GPR22 | GPR21 | GPR20 | GPR19 | GPR18 | GPR17 | GPR16 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| GPR15 | GPR14 | GPR13 | GPR12 | GPR11 | GPR10 | GPR9 | GPR8 | GPR7 | GPR6 | GPR5 | GPR4 | GPR3 | GPR2 | GPR1 | GPR0 |

BREAKPOINT MATCH DISABLE BITS

0 = THE REGISTER ASSOCIATED WITH THIS BIT HAS DATA BREAKPOINT MATCHING ENABLED.
1 = THE REGISTER ASSOCIATED WITH THIS BIT HAS DATA BREAKPOINT MATCHING DISABLED.

*FIG. 3*

```
ADD         R1, R2, R3              R1 ← R2+R3
SUB         R4, R4, R2              R4 ← R4-R2
LEFT SHIFT  R4, R4, #2              R4 ← R4<<2
LOAD        R6, R4, OFFSET1         R6 ← MEM[R4+OFFSET1]    ADDRESS = 0x10000000
MUL         R6, R6, R6              R6 ← R6*R6
SUB         R3, R6, R7              R3 ← R6-R7
STORE       R3, R8, OFFSET2         MEM[R8+OFFSET2] ← (R3)  ADDRESS = 0x20000000
```

METHOD AND APPARATUS FOR QUALIFYING DEBUG OPERATION USING SOURCE INFORMATION

FIELD OF THE INVENTION

The present invention relates to a data processing system, and more particularly, to test and debug features in a data processing system.

RELATED ART

Data processing systems typically incorporate circuitry that functions to permit a programmer to determine various values within a system at differing points in time. The circuitry allows the programmer to evaluate how software execution is affecting the system and is therefore generally referred to as debug circuitry. Various debug operations exist, one of which is a breakpoint. A breakpoint occurs when a particular condition in a system is detected. Upon detection of a breakpoint condition, sequential program flow is interrupted and may be redirected to another predetermined portion of the program. Alternatively, the system or a portion of the system may be placed into an alternate state of processing.

In known systems, breakpoints are taken when the software program incurs a predetermined address, data value and/or attribute. The predetermined addresses, data value and attributes are stored in breakpoint control registers and a comparison is implemented. A breakpoint may be asserted when either an address match, data value match or an attribute match or any combination of matches are detected.

However, for analysis of non-obvious execution errors, existing systems are inadequate. For example, unwanted breakpoint generation may readily occur. Some memories require addresses assigned for dynamic storage of information in a stack to be sequential with addresses corresponding to information which is desired to not be modified. This assignment is a result of a widely accepted usage convention for data processors. The stack length is finite and can frequently be inadequate so that information could spill into the adjacent address range of the stack data. In order to prevent the undesired removal of information outside of the stack data, a breakpoint could be created for the address range outside of the stack data. However, when legitimate addressing of the non-stack data occurs unintended breakpoints are generated which significantly slows processing. In addition to stack data areas, other areas of data assigned for a dedicated processing purpose may be present in the data processing system, and detection of unintended or intended access may be desirable in order to more effectively debug the system with the use of data breakpoints.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The terms "assert" and "negate" are used when referring to the rendering of a signal, bit, or similar apparatus into its logically true or logically false state, respectively. If the logically true state is a logic level one, the logically false state is a logic level zero. Furthermore, the memory described herein may be any type of memory, such as, for example, a read-only memory (ROM), a random access memory (RAM), static random access memory (SRAM), non-volatile memory (e.g. Flash), and magneto-resistive random access memory (MRAM), etc.

Figure 1:
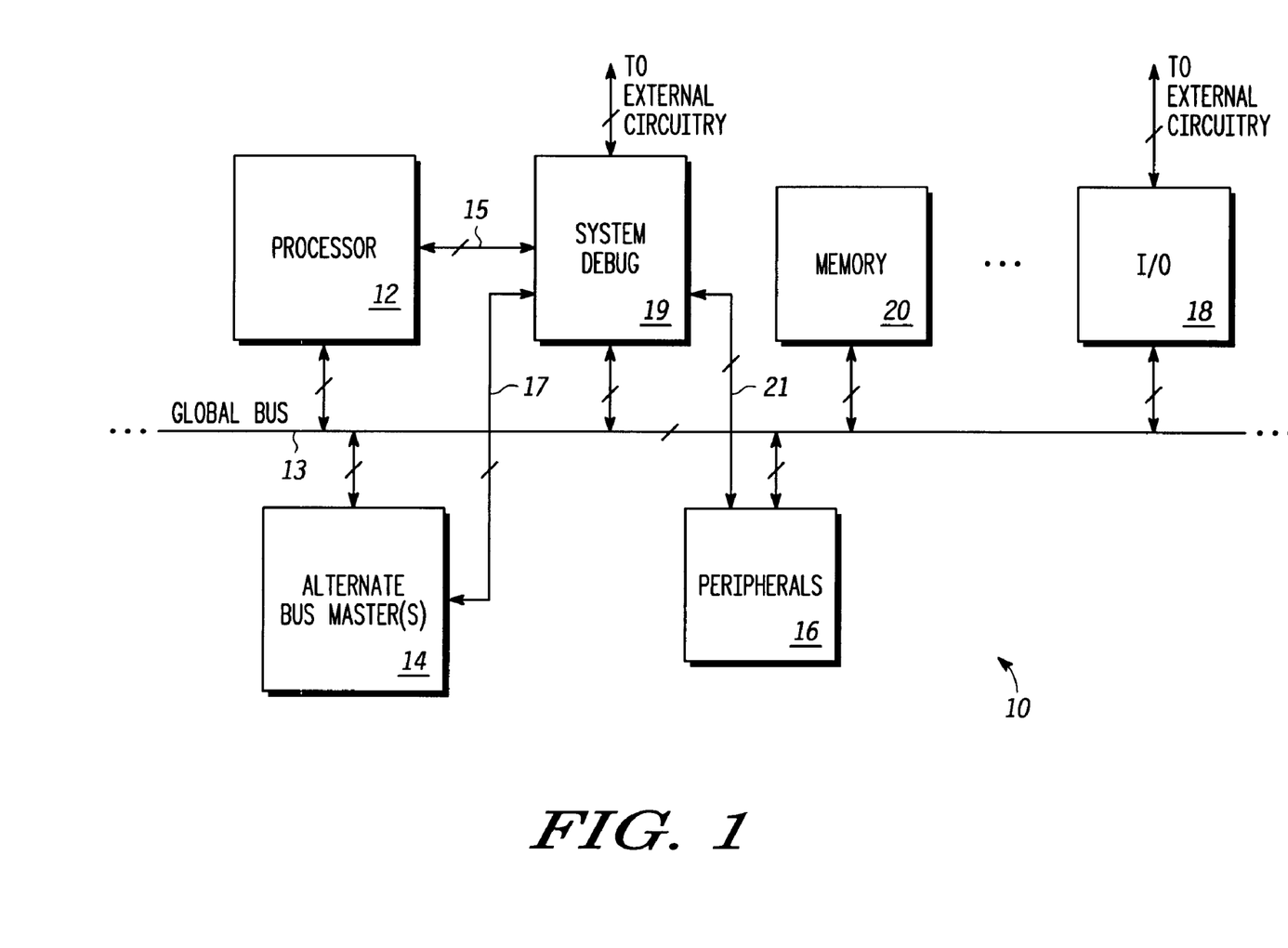
FIG. 1 illustrates in block diagram form a data processing system for implementing a debug method and apparatus in accordance with the present invention.

FIG. 1 illustrates, in block diagram form, a data processing system 10 that uses source information from an identified source to qualify whether debug information is provided. A processor 12 is connected via a bidirectional bus to a global bus 13. All of the buses illustrated in FIG. 1 are multiple conductor communication buses as indicated by a slash and communicate information in the form of data, addresses and control signals. One or more alternate bus master(s) 14 are bidirectionally connected to the global bus 13. An example of an alternate bus master is a direct memory access (DMA) module. The one or more alternate bus master(s) 14 arbitrate with the processor 12 using arbitration circuitry (not shown) for use of the global bus 13 to avoid information transmission conflicts. A system debug module 19 is bidirectionally connected to the global bus 13, to processor 12 via bus 15, to the alternate bus master(s) 14 via a bus 17 and to one or more peripherals 16 via a bus 21. The system debug module 19 is also bidirectionally connected to external circuitry (not shown) such as a hardware tester or other debugging interface hardware. The peripherals 16 may be any of a variety of conventional peripheral devices such as serial interfaces, timers, etc. A system memory 20 is bidirectionally connected to the global bus 13. The system memory 20 may be any of a variety of types of memory circuits including but not limited to dynamic random access memory (DRAM), Flash or magnetoresistive random access memory (MRAM). Other devices may be connected to the global bus 13. Additionally, an input/output (I/O) module 18 is bidirectionally connected to the global bus 13 and to external circuitry (not shown). The I/O module 18 includes various interface circuits depending upon type of external circuitry that is connected to the I/O module 18.

In operation, the system debug module 19 functions as a diagnostic check for data processing operations related to an access to information storage circuitry. The information storage circuitry may be any type of storage circuit that is outside of data processing system 10, within data processing system 10, or within processor 12 of data processing system 10. Therefore, the information storage circuitry may be a cache (not shown), registers (not shown) and other types of data retention circuits utilized by data processing system 10 whether internal to or external to data processing system 10. The processor 12 and alternate bus masters execute software code and obtain mastership of the global bus 13 as needed and selectively access the system memory 20 to retrieve and store data.

Figure 2:
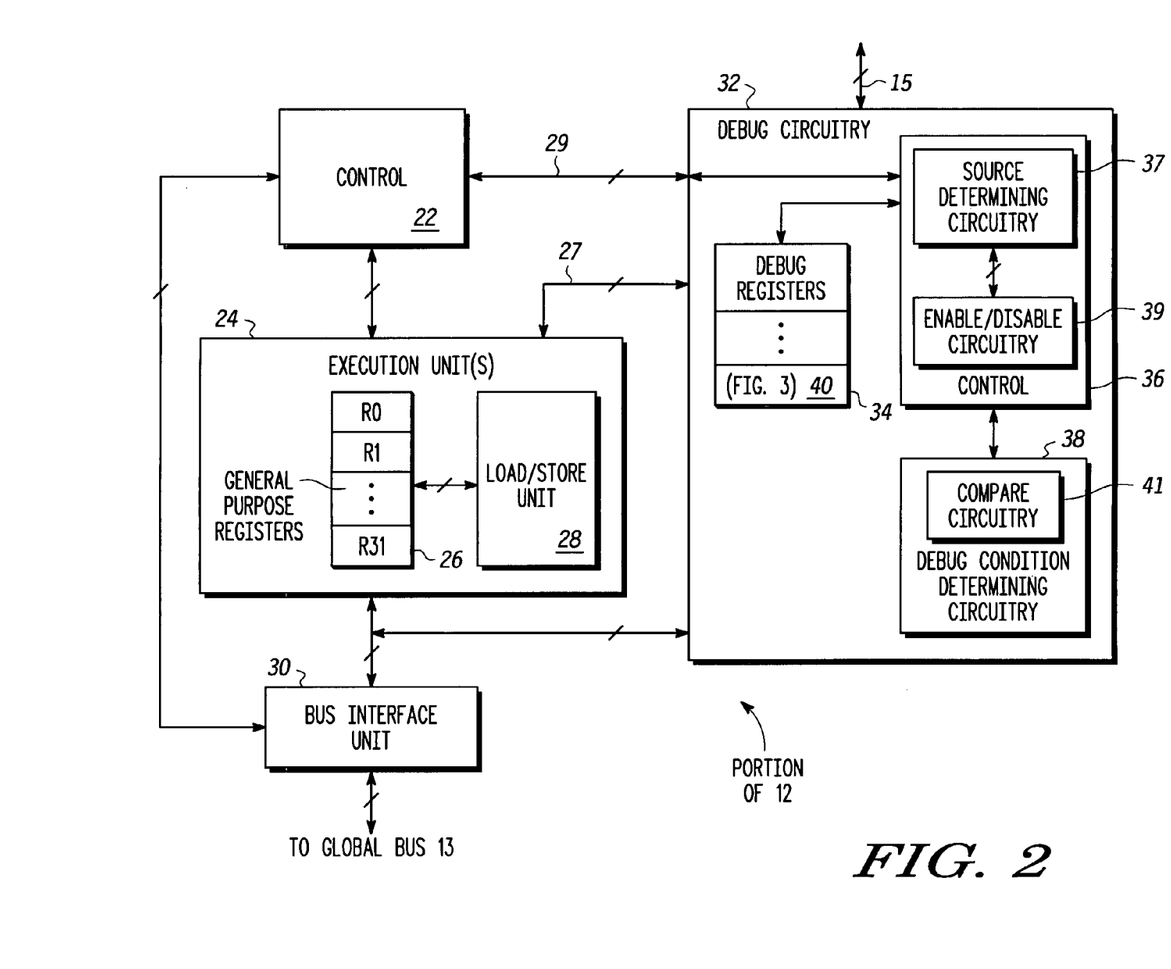
FIG. 2 illustrates in block diagram form a portion of the processor of the data processing system of FIG. 1 having debug circuitry in accordance with the present invention.

Illustrated in FIG. 2 is a portion of processor 12 that further illustrates the debug method and apparatus of data processing system 10. A control circuit 22 is bidirectionally connected to one or more execution unit(s) 24. Within the one or more execution unit(s) 24 is a plurality of general purpose registers (GPRs) 26. In one form, thirty-two GPRs labeled R0 through R31 are provided. A load/store unit 28 is bidirectionally connected to the general purpose registers 26. The load/store unit 28 controls the storage of information in the general purpose registers 26 and the retrieval of information from the general purpose registers 26 in response to a load or store access to a storage location within or external to data processing system 10. A bus interface unit 30 is bidirectionally connected to the execution unit(s) 24. The bus interface unit 30 functions to interface the global bus 13 with the circuitry that is internal to processor 12. The bus interface unit 30 is also bidirectionally connected to control circuit 22 and to debug circuitry 32. The debug circuitry 32 is also bidirectionally connected to the control circuit 22 and to the execution unit(s) 24. Within the debug circuitry 32 is one or more debug registers 34, a control circuit 36 and match circuitry 38 which contains compare circuitry 41. The control circuit 36 is connected to the control circuit 22 via a bidirectional bus 29. Control circuit 36 is bidirectionally connected to the debug registers 34 and to the match circuitry 38. Within the control circuit 36 is source determining circuitry 37 that is bidirectionally coupled to enable/disable circuitry 39.

In operation, the general purpose registers 26 are part of a programmer's model for data processing system 10. The general purpose registers 26 are registers which are selectively visible to the user and which can be accessed by user software. The general purpose registers 26 may be implemented with any type of information storage device. Further, it should be well understood that although the general purpose registers 26 are illustrated as being a part of the execution unit(s) 24 within processor 12, the general purpose registers 26 may be physically implemented anywhere in the data processing system 10. Debug circuitry 32 is enabled by the system debug module 19 of FIG. 1 for monitoring the instruction execution within processor 12 and more specifically monitoring the accessing of the general purpose registers 26 when performing data accesses by load store unit 28 to and from storage locations accessible by processor 12. When the general purpose registers 26 are accessed for performing a load or store operation, the address and optionally the attributes of the access are coupled to control circuit 36 via either the combination of bus 29 and control circuit 22 or via bus 27 and load/store unit 28. In other implementations, the address and attribute information could come directly from global bus 13 to the debug circuitry 32 via a bus (not shown). Examples of attributes that are monitored by debug circuitry 32 include the instruction type that caused the access, such as read or write, one or more operating modes of processor 12, such as supervisor or user mode, etc. When an accessed address is received by control circuit 36, the address is compared with predetermined addresses stored in match circuitry 38 to determine whether the debug function should be enabled. If debug is enabled or asserted, the debug circuitry 32 asserts a debug signal to the system debug module 19 via the bus 15 or asserts the debug signal to bus interface unit 30 and the global bus 13 for use by any circuitry, whether specifically illustrated or not, with access to the global bus 13.

Figure 3:
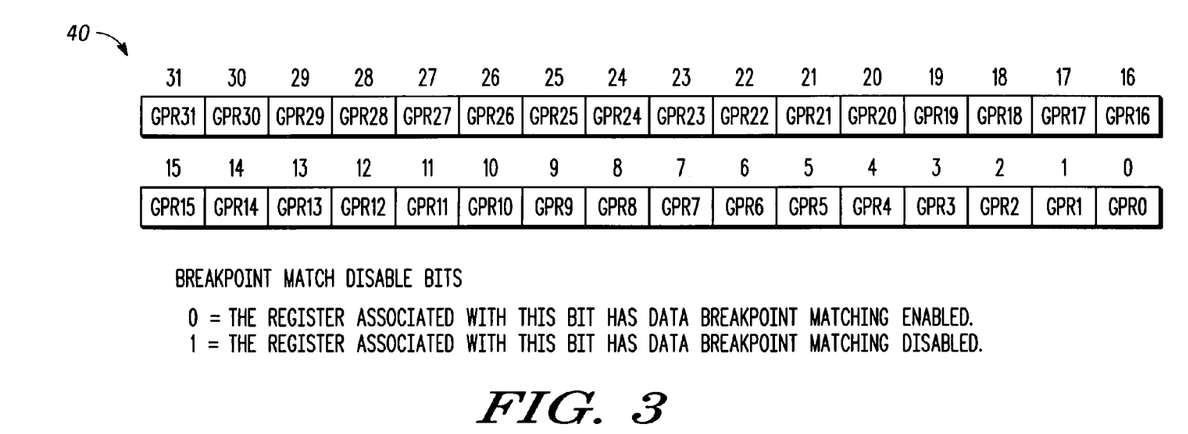
FIG. 3 illustrates in perspective form an organization of one of the debug registers of FIG. 2.

In addition to matching on an address and an attribute, debug registers 34 of FIG. 2 within the debug circuitry 32 function to enable and disable a debug operation related to an access. In particular, refer to FIG. 3 where there is disclosed a debug register 40 which is one of the registers of debug registers 34. In the illustrated form, debug register 40 is implemented as a thirty-two bit register with each bit corresponding to one of the general purpose registers in execution unit(s) 24 of FIG. 2. It should be apparent that the bit implementation for debug register 40 may be varied to include less than all of the GPRs of execution unit(s) 24 or may include other GPRs (not shown) or other types of storage devices. Each bit of the debug register 40 is either a "zero" which means that the general purpose register associated with this bit has debug, such as a data breakpoint matching, a watchpoint operation, a triggering operation, a halting operation, an event counting operation, a qualification of a subsequent debug operation, etc., enabled. When the bit of the debug register 40 is a "one", the general purpose register associated with the bit has debug disabled. The enable/disable circuitry 39 within control circuit 36 of FIG. 2 functions to determine the enable/disable bit value of the register which is sourcing the access information (i.e. address or data), or a portion of collective access information (i.e. address or data). The source determining circuitry 37 which is connected to the enable/disable circuitry 39 functions to identify which register of the debug registers 34 and which bit of the identified debug register is to be examined to determine if debug is enabled or disabled for the access source register. It should be understood that debug registers 34 may be implemented in other locations in the data processing system 10 and may be selected from a pool of registers in the general purpose registers 26.

Figure 4:
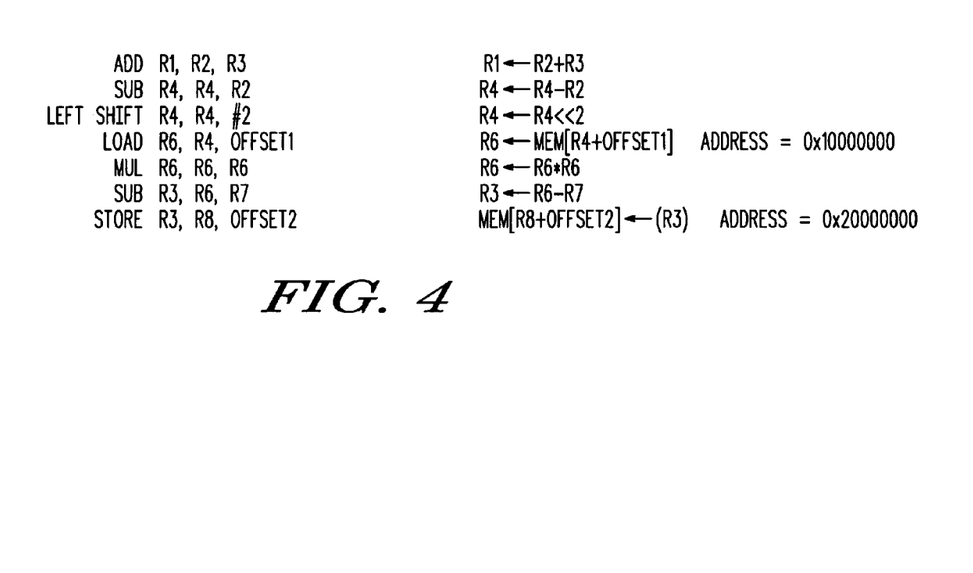
FIG. 4 illustrates in text form debug software programming for use with the debug circuitry of FIG. 2.

Illustrated in FIG. 4 is exemplary software programming for execution by processor 12 in the form of a sequence of data processing instructions. The debug function may be selectively enabled or disabled in response to the accessing of any of the general purpose registers required to execute these instructions. A first instruction is an add instruction where the first register that is specified is a destination register and the second and third registers are source registers. The contents of the general purpose registers R2 and R3 are added and placed in register R1. The second instruction is a subtraction instruction directing that the contents of register R2 are subtracted from the contents of register R4 and placed into register R4. The third instruction is a left shift instruction in which the contents of register R4 is left shifted by two digit positions and placed in register R4. The fourth instruction is a load instruction in which the contents of R4 has a first offset value, OFFSET1, added thereto to form an access address, and the addressed location's contents are read and stored in register R6. The fourth instruction also specifies that the value is stored in system memory 20 at an Address of 0×10000000. The fifth instruction is a multiply instruction in which the contents of register R6 are multiplied as a multiplier and a multiplicand and stored in register R6. The sixth instruction is a subtraction instruction directing that the contents of register R6 has the contents of register R7 subtracted from it and placed in register R3. The seventh instruction is a store instruction directing that the contents of register R8 has a second offset value, OFFSET2, added thereto to form an access address, and the contents of general purpose register R3 are read and stored in system memory 20 at an address of 0x20000000 also specified by the seventh instruction.

Depending upon the value of the corresponding bit in debug registers 34 for each of the accessed registers above, a debug operation may be activated or disabled in response to the execution of any of these load or store instructions. The debug operation may be an operation other than a breakpoint operation which would be generated by the system debug module 19. For example, the debug operation may consist of a watchpoint, tracing, halting, qualifying a subsequent debug operation, triggering a system activity or a subsequent debug activity, and event counting, as well as other functions useful in analyzing a data processing system.

Figure 5:
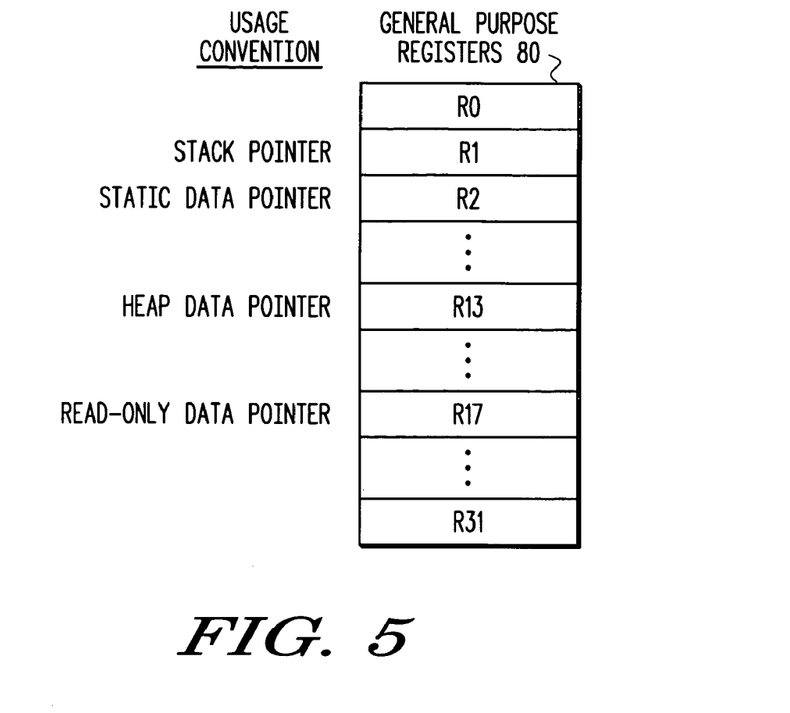
FIG. 5 illustrates in perspective form a functional organization of general purpose registers in the execution unit(s) of the processor portion of FIG. 2.

Illustrated in FIG. 5 is an exemplary general purpose register structure. General purpose registers 80 include registers R0 through R31. Data processing programming has evolved in a manner that register usage has a defacto convention or protocol regarding how to set the general purpose registers with pointers. In the example, register R1 points to a top of a data stack in which data is put on and pulled off dynamically. A current stack pointer is assigned to register R1. Static data that is not desired to be overwritten or replaced is pointed to by adjacent register R2 as indicated by the static data pointer. Other static data pointers such as a heap data pointer at register R13 and a read-only data pointer at register R17 are illustrated. Because data areas pointed to by registers R2, R13 and R17 are static, it is desired to qualify accesses which use one of these areas. However, these areas are often positioned adjacent to stack data that can overflow into one of the static data areas or heap space.

Figure 6:
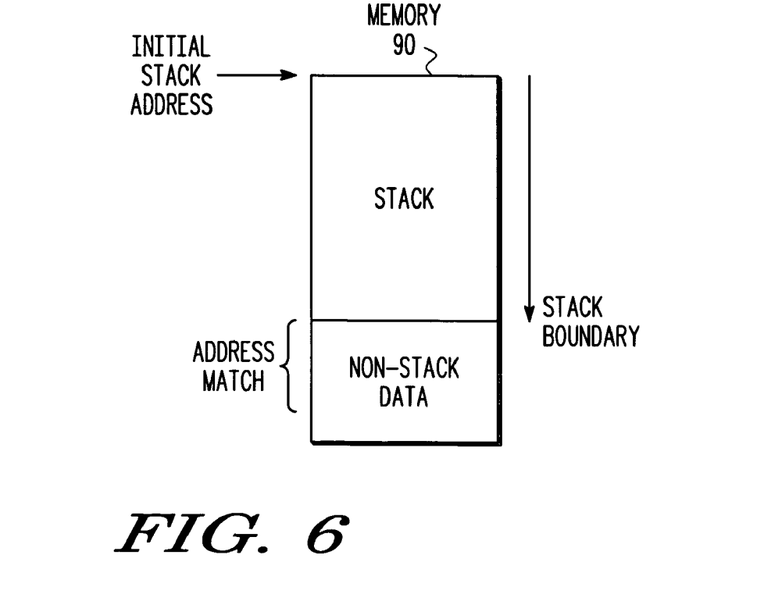
FIG. 6 illustrates an exemplary memory structure in connection with the method of the present invention.

Illustrated in FIG. 6 is an exemplary organization of a memory 90 having an assigned address region for information that is added and removed in a stack and an assigned address region for stack data. The stack begins with a predetermined initial address and extends to a last stack address existing at a stack boundary. Information is added and removed from the stack in accordion-style. The non-stack data should not be written over or modified by stack accesses. One technique to keep the non-stack data from being encroached upon by information in the stack is to perform a debug operation such as a breakpoint every time there is an address match of any non-stack data address within a certain range of the stack boundary. However, in such an approach, performance is penalized when a true access of the non-stack data is desired within this portion of the non-stack data, as a debug operation is triggered and prevents the access. In the exemplary embodiments, further qualification of the access is made by including debug register values to selectively disable the debug operation based upon the source of the access. In the illustrated embodiment, accesses to any region of memory may be further qualified by the particular general purpose register which is used to form a portion of the access address. Thus, in the example embodiments illustrated in FIGS. 5-6, stack accesses may be further qualified by use of the general purpose register R1 in forming a portion of stack access information, static data accesses may be further qualified by use of the general purpose register R2 in forming a portion of static data access information, heap data accesses may be further qualified by use of the general purpose register R13 in forming a portion of heap data access information, and read-only data accesses may be further qualified by use of the general purpose register R17 in forming a portion of read-only data access information. Note that alternate embodiments may have additional, fewer, or different conventions for general purpose register usage regarding accesses to various types and regions of memory. By providing a screening capability for data access to particular regions of memory, using software convention-based usage of general purposes registers in performing data accesses, the efficiency of performing debug operations may be greatly improved.

As used herein a tracing operation is the capturing of the access information in a storage device for later analysis. A breakpoint operation is a debug operation that interrupts a normal flow of instructions and allows a debug exception routine to be run. A watchpoint operation is a debug operation that generates a signal indicating that the debug operation occurred while allowing normal instruction operation to continue. A halting operation is a debug operation that stops normal instruction flow and allows a debug tool to take control of the data processing system 10. An event counting operation is the incrementing of a counter (not shown) within the debug circuitry 32 to count the number of times a debug operation occurs. A triggering operation is related to a tracing operation. A triggering operation starts one or more other debug operations such as a tracing operation.

There has been provided additional capability for screening out unwanted breakpoint or other debug generation. Again, other debug functions such as tracing, watchpoints, operation halting, event counting and later debug qualification may be implemented. The selective screening is a valuable tool to use in debugging difficult system problems and allows additional functionality. In particular, debug generation is restricted to selected base registers being used in performing data accesses. At least one of the selected base registers may be contained within a programmer's model where the programmer's model generally includes a defined instruction set and user visible registers that can be accessed by user software.

By now it should be appreciated that there has been provided a method and circuitry used during a debug operation related to an access. A determination is made that a debug condition associated with the access has occurred. A determination is made of which one of a plurality of registers within a processor programmer's model sourced the access information associated with the access. A user-determinable enable and disable mechanism is used to specify whether to enable or disable the debug operation and the specified action is then implemented. In one form the user-determinable enable/disable mechanism is a register bit and the one of the plurality of registers is a general purpose register (GPR). In one form the circuitry used during the debug operation is compliant with the IEEE NEXUS ISTO-5001 Debug Interface standard. However, the circuitry and method described herein may be used in other electronic standards as a uniformly adopted method and circuit to implement a debug or diagnostic function.

It should be apparent that various modifications may be made to the disclosed embodiments. For example, processor 12 may be implemented as any of a variety of differing types of data processing circuits for performing various types of processing functions. Any type of storage device in addition to registers may be used. The system may be implemented with any of a variety of differing bit sizes. The order of the debug register fields of the information may be changed in any manner. The number of control bits in the control registers to identify an access source may be changed. Various methods may be used to program the control bits in the debug registers. In yet another form the control bits may also be stored in a static or permanent manner.

In one form there is provided a method for providing debug information. A determination is made that a debug condition has occurred. A determination of which one of a plurality of registers is sourcing at least a portion of the debug information is made. A user-determinable enable/disable mechanism, corresponding to the one of the plurality of registers, specifies whether to enable/disable provision of the debug information. If the user-determinable enable/disable mechanism specifies to disable provision of the debug information, providing the debug information is disabled. If the user-determinable enable/disable mechanism specifies to enable provision of the debug information, providing the debug information is enabled. In one form the debug information is provided during a tracing debug operation. In another form the user-determinable enable/disable mechanism is a register bit, the user-determinable enable/disable mechanism is in a programmer's model, and the one of the plurality of registers is in the programmer's model.

In another form there is provided a method for enabling/disabling a debug operation related to an access. Whether a debug condition associated with the access has occurred is determined. A determination is made as to which one of a plurality of registers is sourcing at least a portion of access information associated with the access. A user-determinable enable/disable mechanism is provided, corresponding to the one of the plurality of registers, to specify whether to enable/disable the debug operation. If the user-determinable enable/disable mechanism specifies to disable the debug operation, the debug operation is disabled. If the user-determinable enable/disable mechanism specifies to enable the debug operation, the debug operation is enabled.

In another form the debug operation is one or more of: a tracing operation, a breakpoint operation, a watchpoint operation, a triggering operation, a halting operation, a triggering operation, a qualification of a subsequent debug operation, or an event counting operation. In another form the user-determinable enable/disable mechanism is a register bit. In yet another form the one of the plurality of registers is within a programmer's model. In one form the programmer's model is a processor programmer's model. In yet another form the one of the plurality of registers is a general purpose register. In another form at least a portion of access information sourced by the one of a plurality of registers is one or more of at least a portion of an address associated with the access, or at least a portion of a data value associated with the access, or at least one attribute associated with the access.

In yet another form there is provided circuitry used during a debug operation. Debug condition determining circuitry determines if a debug condition associated with an access has occurred. The circuitry includes a first source register, a second source register and a first user-determinable enable/disable mechanism corresponding to the first source register. The first user-determinable enable/disable mechanism specifies whether to enable/disable the debug operation when the first source register sources at least a portion of access information associated with the access. A second user-determinable enable/disable mechanism corresponds to the second source register. The second user-determinable enable/disable mechanism specifies whether to enable/disable a debug operation when the second source register sources said at least a portion of access information associated with the access. Source determining circuitry determines if the first source register or the second source register is sourcing said at least a portion of access information associated with the access. Enable/disable circuitry selectively enables/disables the debug operation. The enable/disable circuitry is coupled to said first user-determinable enable/disable mechanism, to said second user-determinable enable/disable mechanism, to said source determining circuitry, and to said debug condition determining circuitry. The enable/disable circuitry disables the debug operation if: (1) the debug condition associated with the access has occurred, and (2) the source determining circuitry determines that the first source register is sourcing the at least a portion of access information associated with the access, and (3) the first user-determinable enable/disable mechanism specifies to disable the debug operation. The enable/disable circuitry also disables the debug operation if: (1) the debug condition associated with the access has occurred, and (2) the source determining circuitry determines that the second source register is sourcing said at least a portion of access information associated with the access, and (3) the second user-determinable enable/disable mechanism specifies to disable the debug operation.

In one form the debug operation includes one or more of a tracing operation, a breakpoint operation, a watchpoint operation, a halting operation, a qualification of a subsequent debug operation, or an event counting operation. In another form the first user-determinable enable/disable mechanism is a first register bit and the second user-determinable enable/disable mechanism is a second register bit.

In yet another form the first source register and the second source register is within a programmer's model. In yet another form the programmer's model is a processor programmer's model. In one form the first source register is a first general purpose register and the second source register is a second general purpose register. In yet another form at least a portion of access information associated with the access is one or more of at least a portion of an address associated with the access, or at least a portion of a data value associated with the access, or at least one attribute associated with the access. In one form one or more source registers could be the destination of the access, such as in a load where the first register determines at least a portion of the access address/attributes and the second register is the destination of a LOAD instruction. In another form the debug condition determining circuitry is compare circuitry which determines if a match has occurred. In yet another form the circuitry is formed on an integrated circuit, and the debug operation is performed in order to debug predetermined circuitry. In a further form the circuitry used during the debug operation is compliant with the IEEE NEXUS ISTO-5001 debug interface standard.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language).

The term coupled, as used herein, is defined as connected, although not necessarily directly, and not necessarily mechanically.

What is claimed is:

1. Circuitry used during a debug operation, comprising:
    debug condition determining circuitry which determines if a debug condition associated with an access has occurred;
    a first source register;
    a second source register;
    a first user-determinable enable/disable mechanism, corresponding to the first source register, said first user-determinable enable/disable mechanism specifying whether to enable/disable the debug operation when the first source register sources at least a portion of access information associated with the access;
    a second user-determinable enable/disable mechanism, corresponding to the second source register, said second user-determinable enable/disable mechanism specifying whether to enable/disable the debug operation when the second source register sources said at least a portion of access information associated with the access;
    source determining circuitry which determines if the first source register or the second source register is sourcing said at least a portion of access information associated with the access; and
    enable/disable circuitry which selectively enables/disables the debug operation, said enable/disable circuitry being coupled to said first user-determinable enable/disable mechanism, to said second user-determinable enable/disable mechanism, to said source determining circuitry, and to said debug condition determining circuitry,
    wherein the enable/disable circuitry disables the debug operation if
        (1) the debug condition associated with the access has occurred, and
        (2) the source determining circuitry determines that the first source register is sourcing said at least a portion of access information associated with the access, and
        (3) the first user-determinable enable/disable mechanism specifies to disable the debug operation, and
    wherein the enable/disable circuitry also disables the debug operation if
        (1) the debug condition associated with the access has occurred, and
        (2) the source determining circuitry determines that the second source register is sourcing said at least a portion of access information associated with the access, and
        (3) the second user-determinable enable/disable mechanism specifies to disable the debug operation.

2. Circuitry as in claim 1, wherein the debug operation comprises one or more of a tracing operation, a breakpoint operation, a watchpoint operation, a triggering operation, a halting operation, a qualification of a subsequent debug operation, or an event counting operation.

3. Circuitry as in claim 1, wherein the first user-determinable enable/disable mechanism comprises a first register bit and the second user-determinable enable/disable mechanism comprises a second register bit.

4. Circuitry as in claim 1, wherein the first source register and the second source register are within a programmer's model.

5. Circuitry as in claim 4, wherein the programmer's model comprises a processor programmer's model.

6. Circuitry as in claim 1, wherein the first source register comprises a first general purpose register and wherein the second source register comprises a second general purpose register.

7. Circuitry as in claim 1, wherein said at least a portion of access information associated with the access comprises one or more of at least a portion of an address associated with the access, or at least a portion of a data value associated with the access, or at least one attribute associated with the access.

8. Circuitry as in claim 1, wherein said debug condition determining circuitry comprises compare circuitry which determines if a match has occurred.

9. Circuitry as in claim 1, wherein the circuitry is formed on an integrated circuit, and wherein the debug operation is performed in order to debug predetermined circuitry.

10. Circuitry as in claim 1, wherein the circuitry used during the debug operation is compliant with a NEXUS debug interface standard.

11. Circuitry used during a debug operation, comprising:
    debug condition determining circuitry which determines if a debug condition associated with an access has occurred;
    a first source register;
    a second source register;
    a first user-determinable enable/disable mechanism, corresponding to the first source register, said first user-determinable enable/disable mechanism specifying whether to enable/disable the debug operation when the first source register sources at least a portion of access information associated with the access;
    a second user-determinable enable/disable mechanism, corresponding to the second source register, said second user-determinable enable/disable mechanism specifying whether to enable/disable the debug operation when the second source register sources said at least a portion of access information associated with the access;
    source determining circuitry which determines if the first source register or the second source register is sourcing said at least a portion of access information associated with the access; and
    enable/disable circuitry which selectively enables/disables the debug operation, said enable/disable circuitry being coupled to said first user-determinable enable/disable mechanism, to said second user-determinable enable/disable mechanism, to said source determining circuitry, and to said debug condition determining circuitry.

12. Circuitry as in claim 11, wherein the debug operation comprises one or more of a tracing operation, a breakpoint operation, a watchpoint operation, a triggering operation, a halting operation, a qualification of a subsequent debug operation, or an event counting operation.

13. Circuitry as in claim 11, wherein the first user-determinable enable/disable mechanism comprises a first register bit and the second user-determinable enable/disable mechanism comprises a second register bit.

14. Circuitry as in claim 11, wherein the first source register and the second source register are within a programmer's model.

15. Circuitry as in claim 14, wherein the programmer's model comprises a processor programmer's model.

16. Circuitry as in claim 11, wherein the first source register comprises a first general purpose register and wherein the second source register comprises a second general purpose register.

17. Circuitry as in claim 11, wherein said at least a portion of access information associated with the access comprises one or more of at least a portion of an address associated with the access, or at least a portion of a data value associated with the access, or at least one attribute associated with the access.

18. Circuitry as in claim 11, wherein said debug condition determining circuitry comprises compare circuitry which determines if a match has occurred.

19. Circuitry as in claim 11, wherein the circuitry is formed on an integrated circuit, and wherein the debug operation is performed in order to debug predetermined circuitry.

* * * * *